United States Patent [19]

Magara

[11] Patent Number: 5,118,915
[45] Date of Patent: Jun. 2, 1992

[54] ELECTRIC DISCHARGE MACHINE

[75] Inventor: Takuji Magara, Aichi, Japan

[73] Assignee: Mitsubishi Denki K.K., Tokyo, Japan

[21] Appl. No.: 707,552

[22] Filed: May 30, 1991

[30] Foreign Application Priority Data

May 30, 1990 [JP] Japan .................. 2-138323

[51] Int. Cl.⁵ .................. B23H 7/18; B23H 7/20
[52] U.S. Cl. ................. 219/69.13; 219/69.16
[58] Field of Search ............ 219/69.13, 69.16, 69.18, 219/69.19

[56] References Cited

U.S. PATENT DOCUMENTS

| 3,609,281 | 9/1971 | Kauffman | 219/69.19 |
| 3,987,269 | 10/1976 | Inoue et al. | 219/69.17 |
| 4,055,777 | 10/1977 | Black | 219/69.16 |

FOREIGN PATENT DOCUMENTS

| 196997 | 10/1986 | European Pat. Off. | 219/69.16 |
| 56-82127 | 7/1981 | Japan . | |
| 61-58252 | 12/1986 | Japan . | |
| 61-58254 | 12/1986 | Japan . | |

Primary Examiner—Geoffrey S. Evans
Attorney, Agent, or Firm—Sughrue, Mion, Zinn, Macpeak & Seas

[57] ABSTRACT

An electric discharge machine in which a machining gap or machining area is calculated from the rise time of a pulse voltage applied to the machining gap to stabilize and optimize the marching operation. An abnormal machining conditions such as an arc discharge can be positively detected and avoided. Further, the low surface roughness finish which is impossible to achieve in a large area machining operation can be accomplished.

10 Claims, 7 Drawing Sheets

ELECTRIC DISCHARGE MACHINE

BACKGROUND OF THE INVENTION

This invention relates to an electric discharge machine in which a machining gap or machining area is calculated from the rise time of a pulse voltage applied between the electrodes, to stabilize and optimize the machining operation.

FIG. 11 shows the arrangement of a conventional electric discharge machine of the type where metal or semi-metal powder material is mixed in a machining solution. In FIG. 11, reference numeral 1 designates an electrode; 2, a machining tank; 3, a workpiece; 4, a machining solution; 5, a smoothing circuit for smoothing interelectrode voltage; 6, a numerical control unit; 7, a servo amplifier for driving an actuator according to instructions provided by the numerical control unit 6; 8, an electric motor driven by the servo amplifier 7; 9, a slider to which the electrode 1 is fixedly secured, the slider 9 being movable in the Z-axis direction by the motor 8; and 10, a machine power source.

It is well known in the art that, in an electric discharge machine of this type, by mixing a powder of predetermined material of about 10 to 40 μm in grain size with a machining solution to a mixing density of about 20 g/l, the mechanical characteristics of the surface of the electrode or workpiece such as corrosion resistance and wear resistance can be improved. That is, the metal surface treatment can be achieved by electric discharging as well as by electric discharge machining to machine and remove a portion of the metal workpiece. Powder materials of this type are semi-metals such as silicon, zirconium, tantalum, tungsten carbide, zirconium boride, and their compounds. A technique of forming a surface layer for a workpiece by using a machining solution containing such semi-metal powder is being developed. This technique will greatly increase the range of application of electric discharge machining.

The operation of the conventional electric discharge machine shown in FIG. 11 will be described.

The electrode 1 is confronted with the workpiece 3 with an interelectrode gap G in the machining tank 2 filled with the machining solution 4 containing powder material. The machining power source 10 comprises: a DC source E; a switching element SW for controlling the application of machining current; a current limiting resistor R; and an oscillator OSC for controlling the on-off operation of the switching element SW. A pulse current I is supplied between the electrode 1 and the workpiece 3. The pulse current I is:

$$I = (E - Vg)/R$$

where Vg is the interelectrode voltage.

The interelectrode voltage Vg is 20 to 30 V during arc discharge, and it is zero (0) volt when the electrode touches the workpiece. Furthermore, the interelectrode voltage Vg is E when no arc discharge takes place, and it is 0 V when the switching element SW is off. Hence, if the interelectrode voltage Vg is detected, and smoothed with the smoothing circuit 5, then the machining gap can be controlled according to the smoothed voltage. That is, when the machining gap is large, it is rather difficult to induce discharges, and the smoothed voltage Vs is high. When the machining gap is small, then discharges are induced with ease, and the smoothed voltage Vs is low. The smoothed voltage Vs is compared with a reference voltage Vr. In accordance with the difference between those voltages, the numerical control unit 6 applies an axial movement instruction to the servo amplifier 7. In response to the instruction, servo amplifier 7 drives the motor 8 thereby to move the slider 9 together with the electrode vertically. Thus, a motor servo mechanism comprising the motor 8 and the slider 9 maintains the machining gap G substantially unchanged.

There is available an electric discharge machine of the type where the machining solution contains no powder material. This conventional electric discharge machine is fundamentally equal in arrangement to the electric discharge machine shown in FIG. 11, although the former is different from the latter in that the machining solution has no powder material, and accordingly the former is fundamentally the same in operation as the latter.

As is apparent from the above description, in the conventional electric discharge machine, a general method of determining whether or not the machining condition is satisfactory is to detect the interelectrode voltage Vg. When the interelectrode voltage is low, the interelectrode impedance is low. The causes for this are, for instance, short-circuiting, continuous arc discharging, and presence of metal powder or sludge in the machining gap.

In the case where the machining solution contains powder material, the machining gap is several times as large as in the case where the machining solution contains no powder material. However, it has been confirmed through experiments that the machining gap depends greatly on the density and grain size of the powder therein. The electrode and the workpiece form a capacitor, the capacitance of which (hereinafter referred to as "the interelectrode capacitance", when applicable) greatly affects the machined surface roughness. In an electric discharge machining operation using a machining solution mixed with powder material, the machining gap is increased to decrease the interelectrode capacitance, to thereby improve the machined surface roughness.

Therefore, in the case when the powder density is decreased by consumption or local precipitation of the powder material, the machining gap is decreased greatly, as a result of which the interelectrode capacitance is increased, thus lowering the machined surface roughness. In the case where the machining solution contains powder material, the frequency of induction of unwanted arc discharges increases greatly with decrease of the machining gap, as a result of which the workpiece may be damaged greatly.

An electric discharge machining operation using a machining solution containing no powder material suffers from the following difficulty: If an abnormal arc discharge occurs, which is most serious in an electric discharge machining operation, carbon is formed by thermal decomposition of the machining solution, as a result of which electric discharges are induced between the carbon thus formed and the workpiece as if the interelectrode impedance were increased. Hence, it is impossible to detect from the smoothed voltage whether or not the interelectrode condition is acceptable.

The control of the discharge gap, employing the above-described smoothed voltage, suffers from the following difficulties: In the case when a large quantity of sludge is present in the discharge gap, secondary electric discharges take place frequently, so that the smoothed voltage is decreased. Hence, although the machining gap is large, it is detected as if it were small, as a result of which the machining gap is erroneously increased. Furthermore, in the case where the pause time is changed with the reference voltage Vr held constant, the machining gap is also changed. Accordingly, with automatic pause control, the machining gap is not secured, thus adversely affecting the machining accuracy.

In order to eliminate the above-described difficulties accompanying a conventional electric discharge machine, for instance Published Examined Japanese Patent Application No. 58252/1986 or 58254/1986 has proposed a method of estimating the machining gap from the difference between the present position and the most advanced position of the electrode. However, this method is still disadvantageous in that the most advanced position itself includes an error on the order of several tens of micrometers, and, when protrusions are formed locally by arcs, the measurement accuracy is greatly lowered.

Published Unexamined Japanese Patent Application No. 82127/1981 has disclosed a method in which high frequency voltage is applied to a machining gap, and the length of the machining gap is measured from the variation of the current flowing therein. However, this method is also disadvantageous in that it is necessary to additionally provide a high frequency source, and the measurement accuracy is not so high because the machining gap length is measured while the change in resonance condition is being detected.

Furthermore, the conventional electric discharge machine suffers from the following difficulties: If machining electrical conditions and reciprocation conditions are not suitably set for the machining area, then discharge concentration takes place to consume the electrode abnormally or produce arcs abnormally. Therefore, before a machining operation is started, it is necessary to calculate the approximate value of the electrode area (or machining area) thereby to suitably determine operating conditions for the electrode area thus calculated. In an actual machining operation, generally the machining area changes as the operation advances, and therefore it is necessary to write a program so that the machining conditions are changed with the advance of the machining operation. However, even if the operating conditions are changed in this manner, problems to be solved are involved as follows: In the case where the initial machining area is considerably small as in the case when electric discharge is started with a rib-shaped or spear-shaped electrode, and is abruptly increased as the machining operation advances, or in the case where, because the electrode is intricate in configuration, it is difficulty to estimate the change in the machining area with the advance of the machining operation; the program for changing the operating conditions is necessarily intricate, and it is rather difficult to maintain the machining conditions most suitable at all times. Thus, in the electric discharge machining operation with the above-described unique electrode, the machining characteristics such as machining speed and machining accuracy are greatly lowered.

SUMMARY OF THE INVENTION

Accordingly, an object of this invention is to eliminate the above-described difficulties accompanying a conventional electric discharge machine.

More specifically, an object of the invention is to provide an electric discharge machine in which a machining gap or machining area is calculated from the rise time of a pulse voltage applied to the discharge gap or a detecting pulse supplied during a discharge pause (duill) period, to stabilize and optimize the machining operation.

An electric discharge machine in which a workpiece is machined with a pulse-like voltage applied to a machining gap defined by the workpiece and an electrode in a machining vessel, according to a first aspect of the invention, comprises: measuring means for measuring the rise time of the pulse-like voltage; and arithmetic means for calculating a machining gap or machining area from the result of measurement of the measuring means, so that the electric discharge machining operation is stabilized according to the result of calculation. The machining gap calculation is applicable to both the electric discharge machine where the machining solution containing metal or semi-metal powder material is supplied to the machining gap and to the electric discharge machine using no powder.

An electric discharge machine in which a workpiece is machined with a pulse-like voltage applied to a machining gap formed between the workpiece and an electrode in a machining vessel, according to a second aspect of the invention, comprises: detecting voltage supplying means for applying a detecting pulse voltage during the pause period when the pulse-like voltage is not applied; measuring means for measuring the rise time of the detecting pulse voltage; and arithmetic means for obtaining a machining gap or machining area from the result of measurement of the measuring means and a preset machining area, so that the machining operation is stabilized according to the result of calculation. The calculation technique is applicable to both the electric discharge machine using metal or semi-metal powder and the electric discharge machine using no powder.

BRIEF DESCRIPTION OF THE DRAWINGS

In the accompanying drawings.

DESCRIPTION OF THE PREFERRED EMBODIMENTS

Preferred embodiments of this invention will be described with reference to the accompanying drawings.

Figure 1:
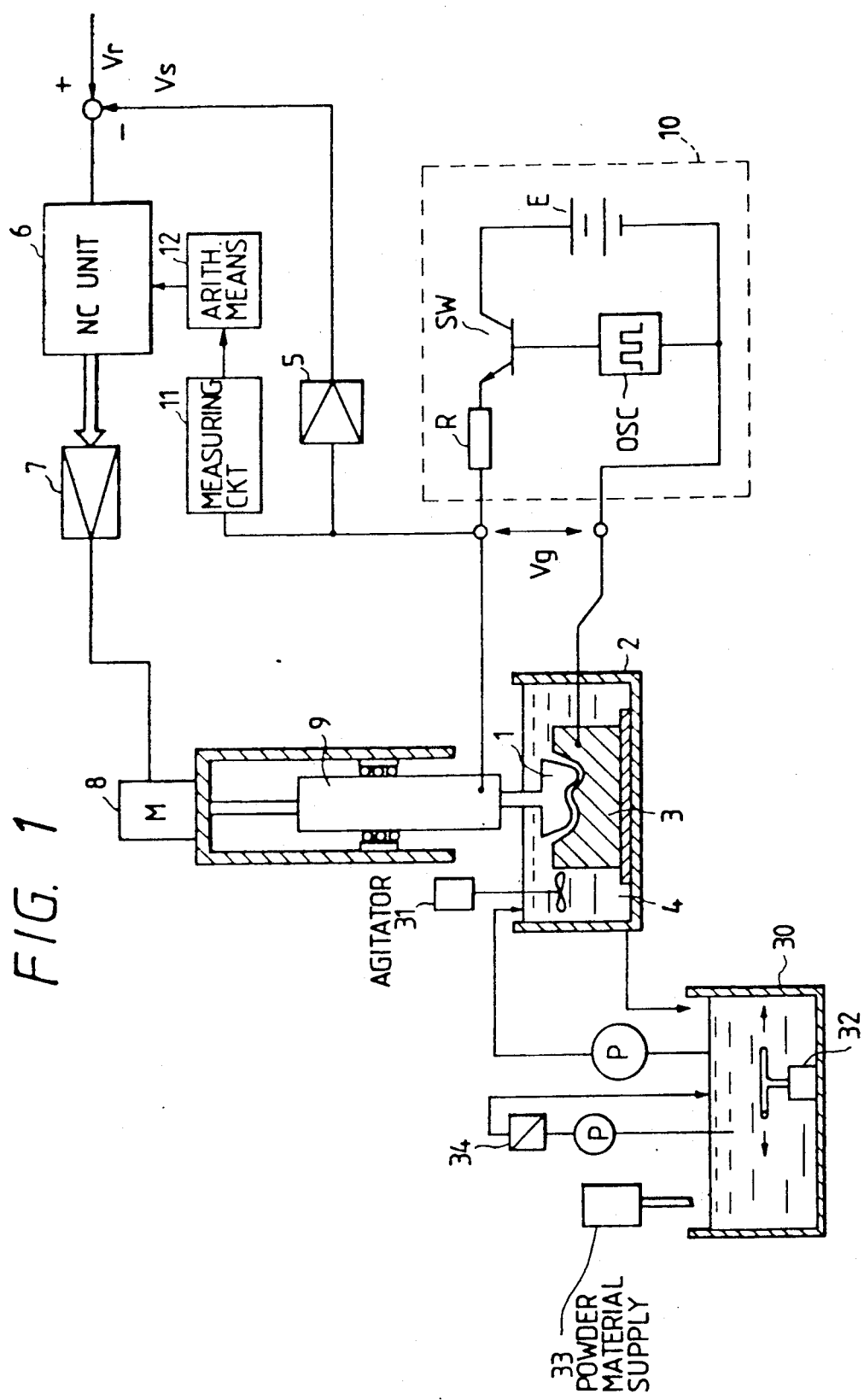
FIG. 1 is an explanatory diagram, partly as a block diagram, showing the arrangement of an electric discharge machine, a first embodiment of this invention.

FIG. 1 is a diagram showing the arrangement of an electric discharge machine, a first embodiment of the invention. In FIG. 1, reference numeral 1 designates an electrode; 2, a machining vessel; 3, a workpiece; 4, a machining solution containing powder material; 5, a smoothing circuit; 6, a numeral control unit; 7, a servo amplifier; 8, an electric motor; 9, a slider; 10, a machining power source; 11, a measuring circuit for measuring the rise time of a machining pulse voltage; 12, arithmetic means for obtaining a machining gap from the result of measurement of the measuring circuit 11; 30, a machining solution tank; 31 and 32, agitators; 33, a powder material supplementing unit; and 34, a powder material removing filter.

Figure 2:
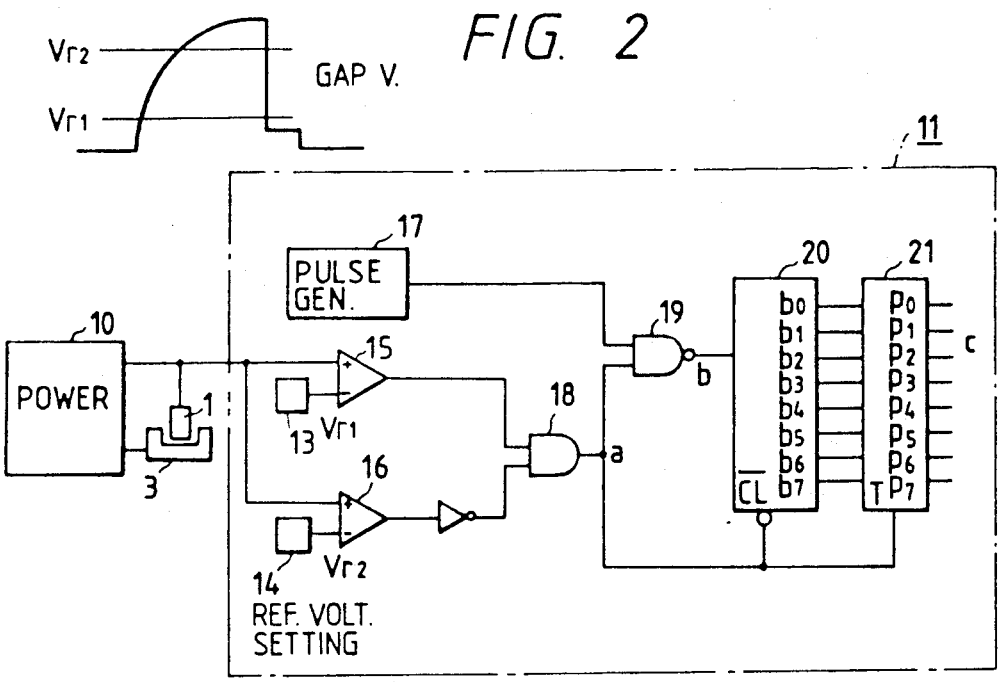
FIG. 2 is a block diagram showing one example of a measuring circuit in FIG. 1.

FIG. 2 shows the measuring circuit in more detail. In FIG. 2, reference numerals 13 and 14 designate reference voltage setting units; 15 and 16, comparators for comparing a rise-up voltage with the reference voltages; 17, a reference count pulse generator; 18, an AND circuit; 19, a NAND circuit; 20, a counter for counting a voltage rise time; and 21 a latch circuit for holding the output of the counter 20.

The electric discharge machine thus organized operates a follows:

Similarly as in the conventional electric discharge machine, the machining power source 10 applies machining current between the electrode 1 and the workpiece 3 to machine the latter. In the electric discharge machining operation, an interelectrode voltage Vg is smoothed by the smoothing circuit 5 into a smoothed voltage Vs. The smoothed voltage Vs is compared with a reference voltage Vr, and in accordance with the difference between those voltages the numerical control unit 6 applies an axial movement instruction to the servo amplifier 7, so that the slider 9 together with the electrode 1 is moved vertically. At the same time, the measuring circuit 11 measures the rise time of the interelectrode voltage pulse.

In the measuring circuit 11 shown in FIG. 2, the reference voltage setting unit 13 applies a low voltage level Vr1 obtained at the rise time of the voltage pulse to the comparator 15, while the other reference voltage setting unit 14 applies a high voltage level Vr2 to the comparator 16. In the comparators 15 and 16, the interelectrode voltage is compared with the reference voltages Vr1 and Vr2, respectively. When the interelectrode voltage is higher than the reference voltages Vr1 and Vr2, the comparators 15 and 16 provide "H" outputs (high level outputs). The outputs of the comparators are supplied to the AND circuit 18.

Figure 3:
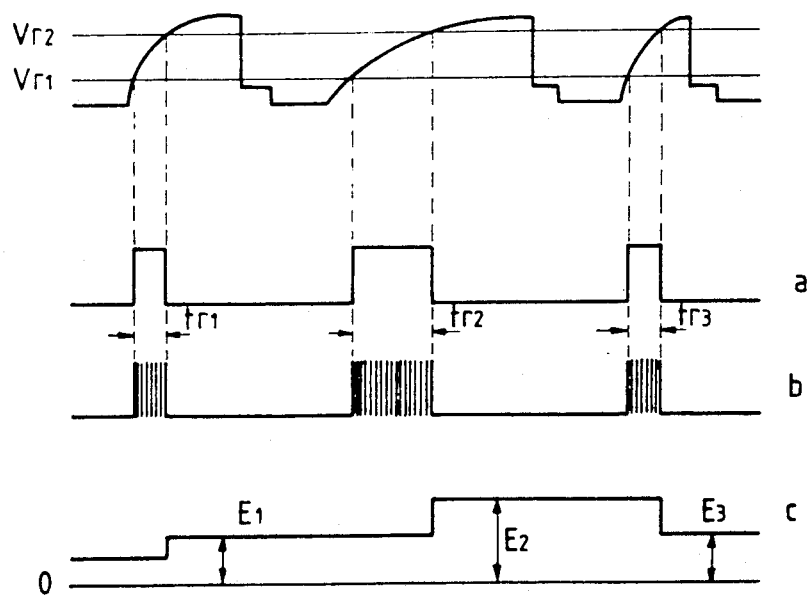
FIG. 3 is a time chart for a of the operation of the measuring circuit.

FIG. 3 is a timing chart for a description of the operation of the measuring circuit 11. As is apparent from FIG. 3, the AND circuit 18 outputs a train of pulses whose widths correspond to the periods of time tr1, tr2, tr3, . . . in which the interelectrode voltage rises from Vr1 to Vr2.

The output pulses (a) of the AND circuit 18 and the output of the reference count pulse generator 17 are applied to the NAND circuit 20, which outputs a train of pulses (b). The counter 20 counts the train of pulses (b)), and applies its outputs corresponding to the rise times to the latch circuit 21. The latch circuit 21 provides output signals (c) having values E1, E2, E3, . . . corresponding to the rise times tr1, tr2, tr3, . . . with the timing of the falls of the output pulse (a), and holds them until the following voltage application time. The output signals (c) are of digital data; however, for convenience in description, they are shown as analog data.

As was described before with reference to the conventional electric discharge machine, when the machining conditions become worse so that short-circuiting or continuous arc discharging takes place, the smoothed voltage Vs is not always proportional to the machining gap (or interelectrode distance), and therefore it is impossible to detect the deterioration of the interelectrode conditions from the smoothed voltage.

On the other hand, the machining gap can be obtained from measurement of the electrostatic capacity formed between the electrode and the workpiece. The electrostatic capacity (C) can be represented by the following equation (1):

$$C = \epsilon(S/G) \quad (1)$$

where S is the area of the electrode and workpiece, G is the machining gap, and $\epsilon$ is the dielectric constant of the machining solution.

Therefore, if it is assumed that the electrode area S known, then the machining gap G can be obtained by measuring the electrostatic capacity C or data equivalent to it by some method.

On the other hand, the electrostatic capacity C formed between the electrode and the workpiece relates to the rise time tr (tr1, tr2, . . . ) of the voltage applied to the latch circuit 21 as follows:

$$Vr1 = E(1 - e^{-t1/RC}) \quad (2)$$

$$Vr2 = E(1 - e^{-t2/RC}) \quad (3)$$

$$tr = t2 - t1 \quad (4)$$

where R is the resistance of the machining power source, E is the voltage of the power source; t1 is the rise time required for the voltage applied to rise to Vr1; and t2 is the rise time required for the voltage to rise to Vr2.

Thus, with t1 and t2 obtained from equations (2) and (3), the electrostatic capacity C can be obtained from tr.

Figure 4:
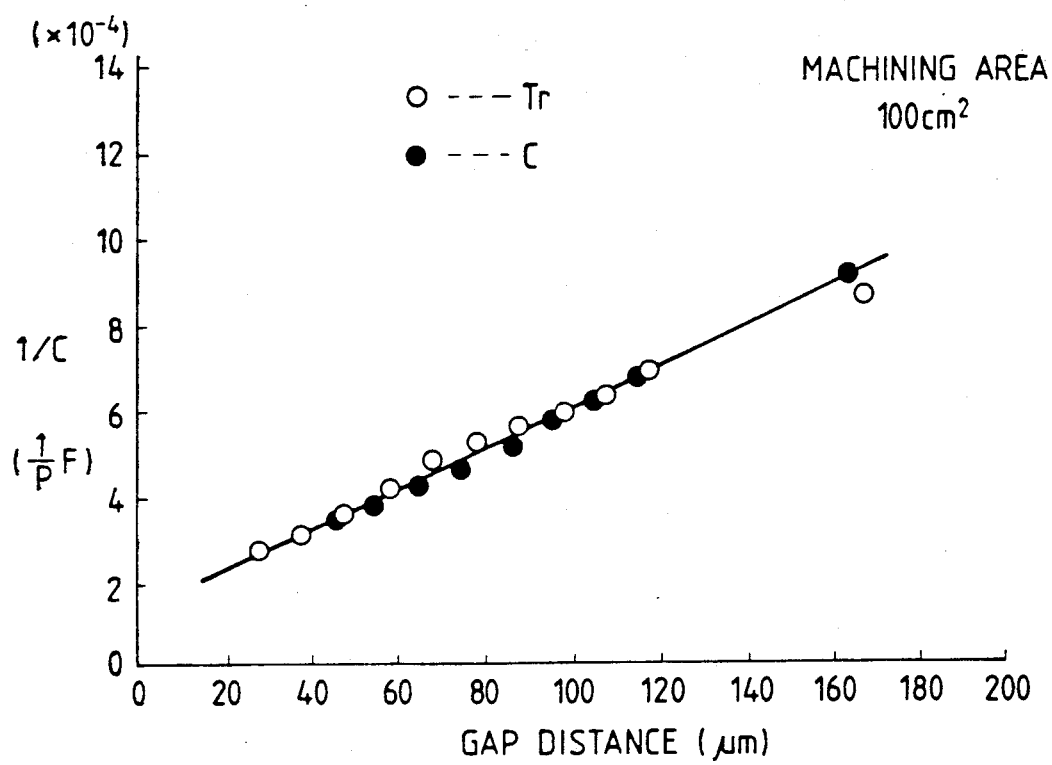
FIG. 4 is a graphical representation relating the machining gap variation with interelectrode electrostatic capacity.

FIG. 4 shows electrostatic capacities C which are calculated from equation (1) by using voltage rise times tr measured. As is apparent from FIG. 4, the interelectrode electrostatic capacity C changes with the machining gap (being inversely proportional to the machining gap (distance), whereas the value of calculation from the voltage rise time tr coincides substantially with the electrostatic capacity C measured, and therefore the voltage rise time tr changes with the interelectrode electrostatic capacity.

Figure 5:
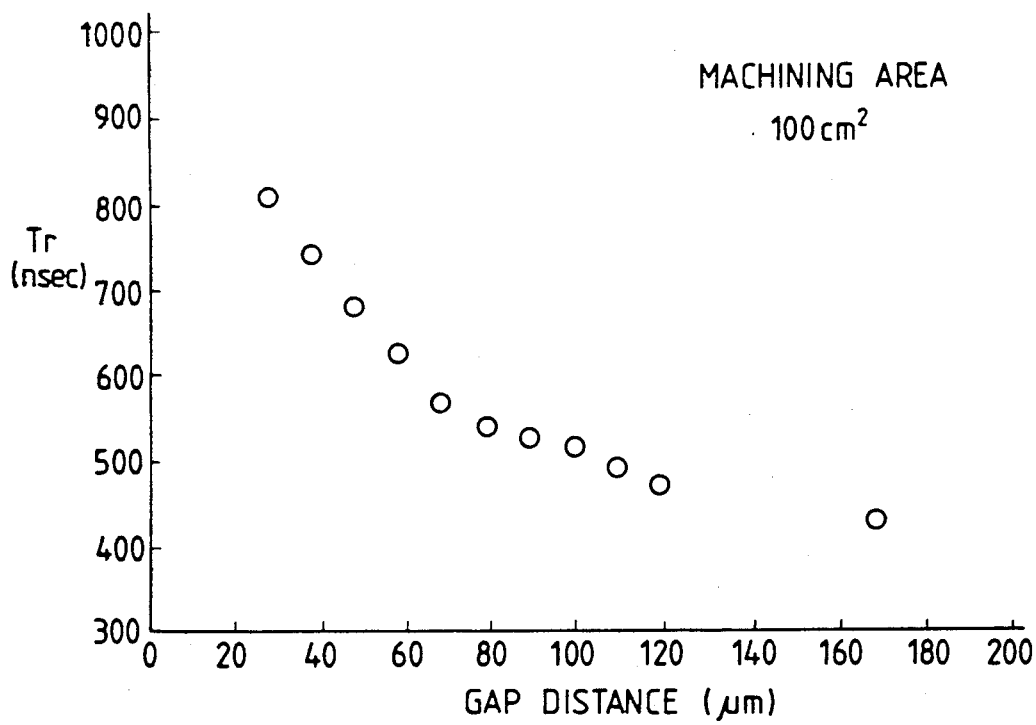
FIG. 5 is also a graphical representation indicating voltage rise time with machining gap.

FIG. 5 shows voltage rise time tr with machining gap (distance). As was described before, the electrostatic capacity C changes with the machining gap. Therefore, the voltage rise time tr also changes greatly with the machining gap. Thus, the machining gap (distance) can be obtained by measuring the voltage rise time tr. That is, the result of measurement of the measuring circuit 11 is read by the arithmetic means 12 at predetermined time intervals, so that the electrostatic capacity C is calculated from the above-described equations (2) and (3) by using the voltage rise time tr. Next, the machining gap (distance) is calculated from equation (1) using the electrode area known in advance. The machining gap (distance) thus obtained by the arithmetic means 12 is applied to the numerical control unit 6. The numerical control unit 6 changes the machining electrical conditions, machining solution conditions and reciprocation conditions according to the machining gap (distance) to stabilize and optimize the machining operation, and displays the machining gap and the machining conditions on the display unit.

For instance, in the case when the machining gap increases, this means that arc discharges are being induced, and therefore the numerical control device 6 controls the machining power source 10 to increase the pause or dwell time or the frequency of reciprocation. In the case when the machining gap decreases abnormally, the numerical control device 6 operates the agitators 31 and 32 until the machining solutions in the machining vessel and the machining solution tank become uniform in powder density. If this agitation cannot increase the machining gap, then the powder material removing filter 34 is operated to remove the powder material, and the powder material supplementing unit 33 is operated to supply new powder material.

In the above-described embodiment, the measuring circuit 11 measures the time required for the voltage to rise from Vr1 to Vr2. However, in this embodiment, the measuring circuit 11 may be modified as follows: the comparators 15 and 16 can be combined into one unit so that the rise time tr is measured from the time required for the voltage to rise to Vr1 from its application to the machining gap.

Figure 6:
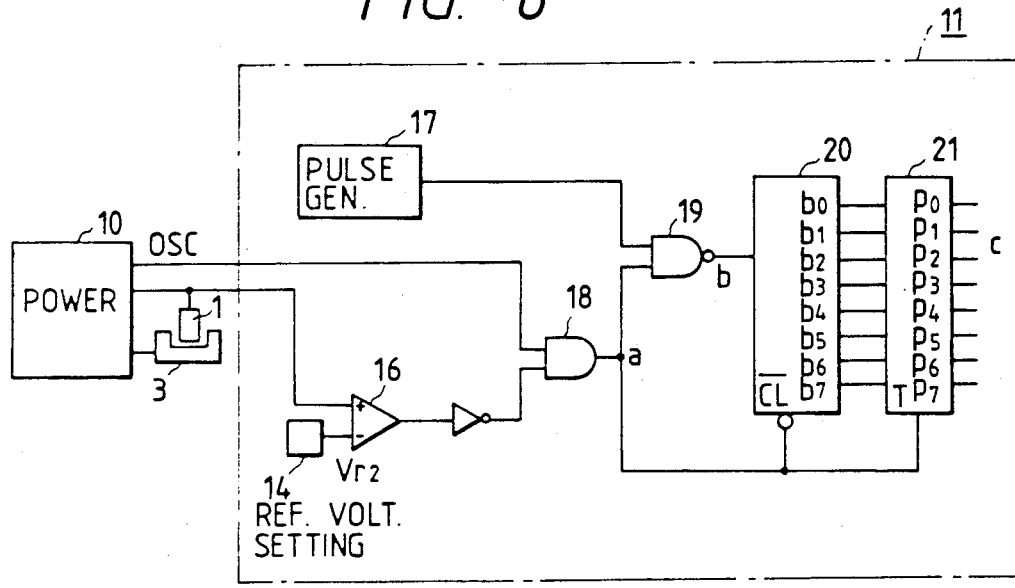
FIG. 6 is a block diagram showing another example of the measuring circuit in the invention.

This modification is as shown in FIG. 6. In the measuring circuit 11, the output pulse of the oscillator OSC in the machining power source 10 is applied to the AND circuit 18. That is, the measuring circuit 11 shown in FIG. 6 corresponds to that in FIG. 2 in which Vr1=0.

A second embodiment of the invention, an electric discharge machine, will be described with reference to FIG. 7, in which parts functionally corresponding to those which have been already described with reference to FIG. 1 are therefore designated by the same reference numerals or characters. As is apparent from FIG. 7, the second embodiment is obtained by adding a detecting voltage supplying circuit 22 to the first embodiment shown in FIG. 1.

The operation of the second embodiment will be described.

Figure 8:
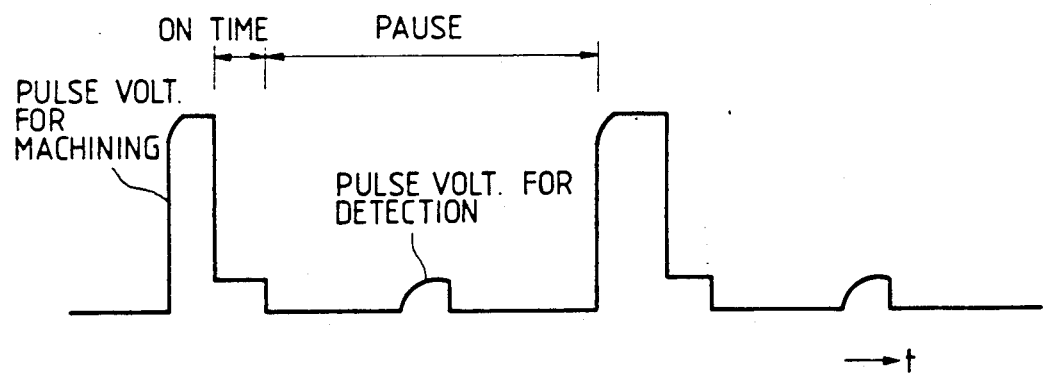
FIG. 8 is a time chart showing a detecting pulse voltage in the invention.

Similarly as in the first embodiment shown in FIG. 1, the machining power source 10 applies machining current between the electrode 1 and the workpiece to machine the latter. During the machining operation, the interelectrode voltage Vg is smoothed by the smoothing circuit 5 into a smoothed voltage Vs. The smoothed voltage Vs is compared with a reference voltage Vr, and in accordance with the difference between those voltages the numerical control unit 6 applies an axial movement instruction to the servo amplifier 7, so that the slider 9 together with the electrode 1 is moved vertically. As shown in FIG. 8, the detecting voltage supplying circuit 22 applies a low pulse voltage of 20 to 40 V having a pulse width on the order of one to several microseconds ($\mu$s) to the interelectrode gap during the pause period. At the same time, the measuring circuit 11 measures the rise time of the detecting pulse voltage. That is, in the measuring circuit 11 shown in FIG. 2, the reference voltage setting unit 13 applies a low voltage level Vr1 obtained at the rise time of the detecting pulse voltage to the comparator 15, while the other reference voltage setting unit 14 applies a high voltage level Vr2 to the comparator 16.

In the comparators 15 and 16, the detected interelectrode voltage is compared with the reference voltages Vr1 and Vr2, respectively. When the interelectrode voltage is higher than the reference voltages Vr1 and Vr2, the comparators 15 and 16 provide "H" outputs (high level outputs). The outputs of the comparators are supplied to the AND circuit 18. The output of the AND circuit 18 is processed similarly as in the case of the first embodiment shown in FIG. 1. The latch circuit 21 produces an output signal (c) corresponding to the rise time required for a detecting pulse voltage to rise from Vr1 to Vr2.

In the second embodiment, equations (1) through (4) employed in the first embodiment are employed, so as to obtain electrostatic capacity C from rise time tr. Accordingly, FIG. 4 showing voltage rise time tr with electrostatic capacity C is employed. In addition, FIG. 5 indicating voltage rise time tr with machining gap can be applied to the second embodiment. That is, since the electrostatic capacity C changes with the machining gap, the voltage rise time tr also changes greatly with the machining gap.

The voltage rise time tr is measured in the above-described manner, and the machining gap is calculated similarly as in the first embodiment described with reference to FIG. 1, so that control is made according to the variation in the machining gap (distance) thus calculated.

In each of the above-described first and second embodiments, the machining solution contains powder material. However, it should be noted that the technical concept of the invention is applicable to an electric discharge machine using a machining solution containing no powder material. In this case, the control is the same as in the first embodiment except for the treatment of the powder material.

In the above-described embodiments, the machining conditions etc. are changed according to the machining gap. On the other hand, in an electric discharge machine using a machining solution containing no powder material, the machining gap is constant as long as the machining conditions are normal and the electrical conditions are maintained unchanged. Therefore, the machining conditions, etc. may be changed by calculating the machining area from the above-described equation (1).

Figure 7:
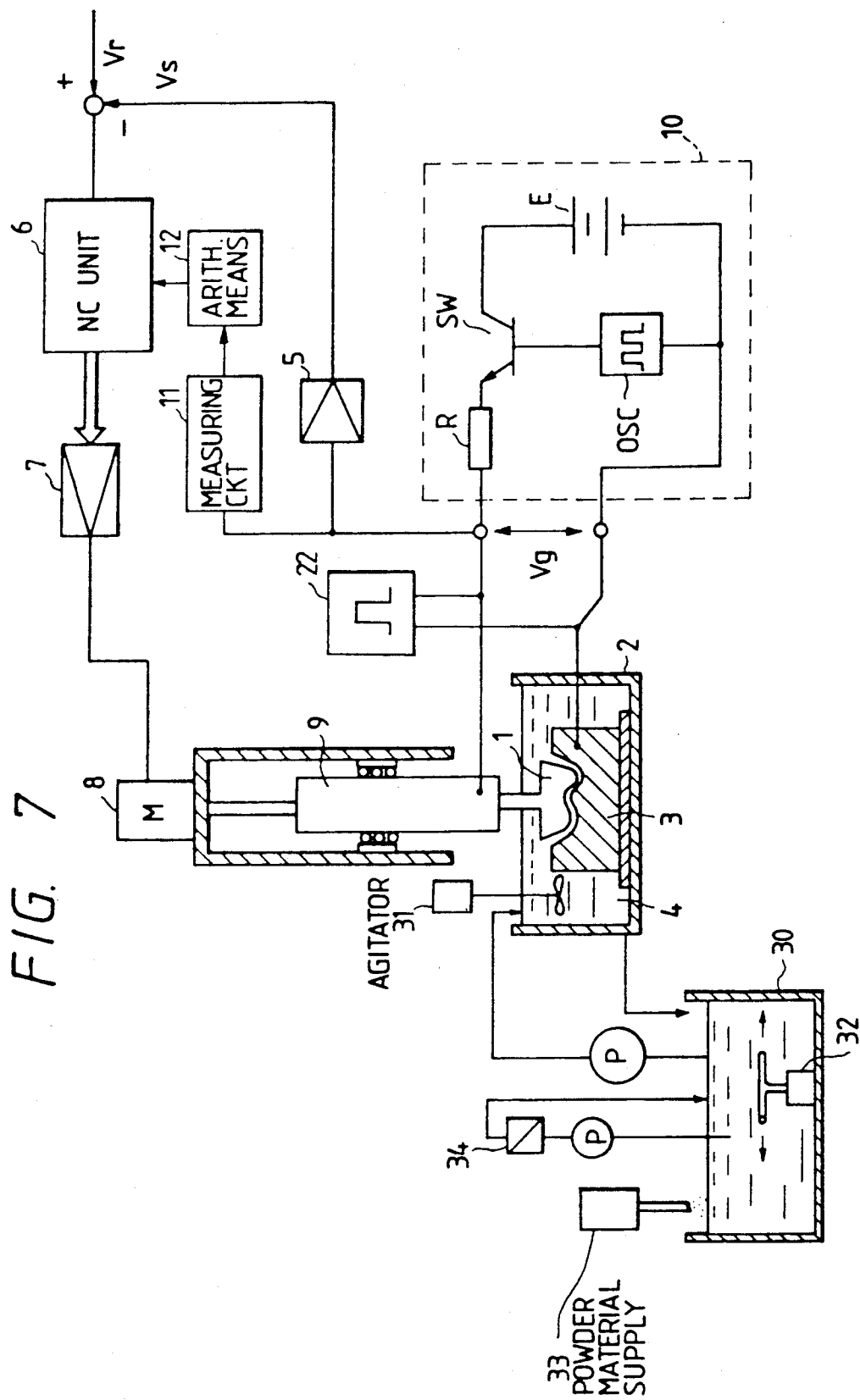
FIG. 7 is an explanatory diagram, partly as a block diagram, showing the arrangement of an electric disc machine, a second embodiment of the invention.

In this case, the arithmetic means 12 in FIG. 1 or 7 reads the result of measurement of the measuring circuit 11 at predetermined time intervals, and calculates the electrostatic capacitance C from the voltage rise time tr according to the above-described equations (2) and (3) (cf. FIG. 4). The machining gap is known from the electrical conditions and the interelectrode smoothed voltage Vs, and therefore the machining area S is calculated from equation (1) (S=G C/$\epsilon$).

Figure 9:
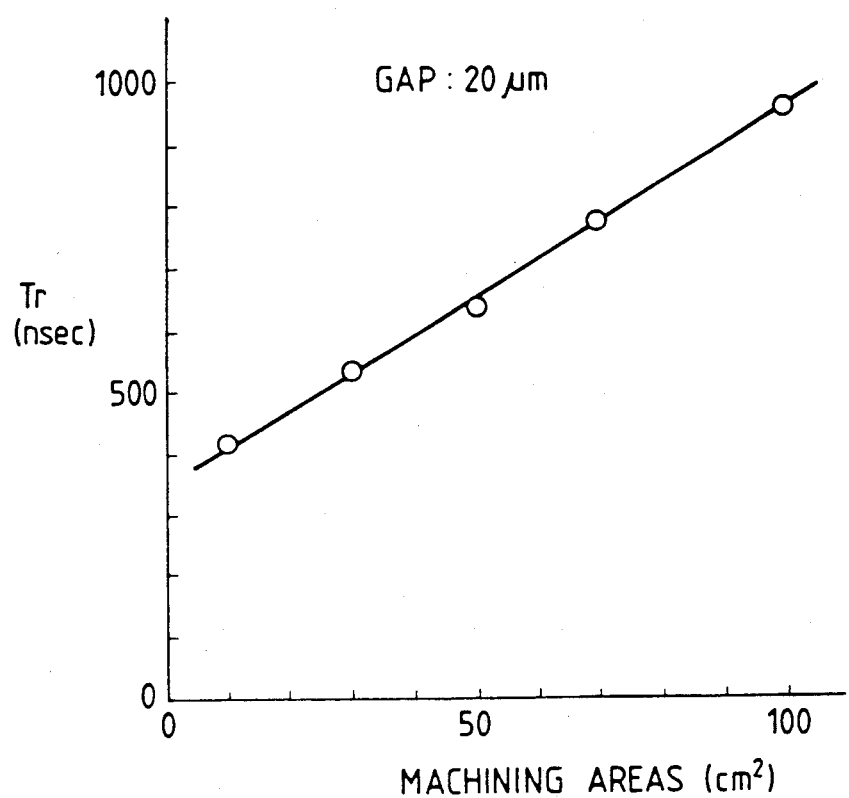
FIG. 9 is a graphical representation indicating machining area with voltage rise time.

FIG. 9 indicates voltage rise time tr with machining area S. As is apparent from FIG. 9, the voltage rise time tr changes greatly with the machining area S.

The machining area thus obtained by the arithmetic means 12 is supplied to the numerical control unit 6.

The latter 6 changes the machining electrical conditions, machining solution conditions and reciprocation conditions according to the machining area, to stabilize and optimize the machining operations, and displays the machining area and the machining conditions on the display unit.

Figure 10:
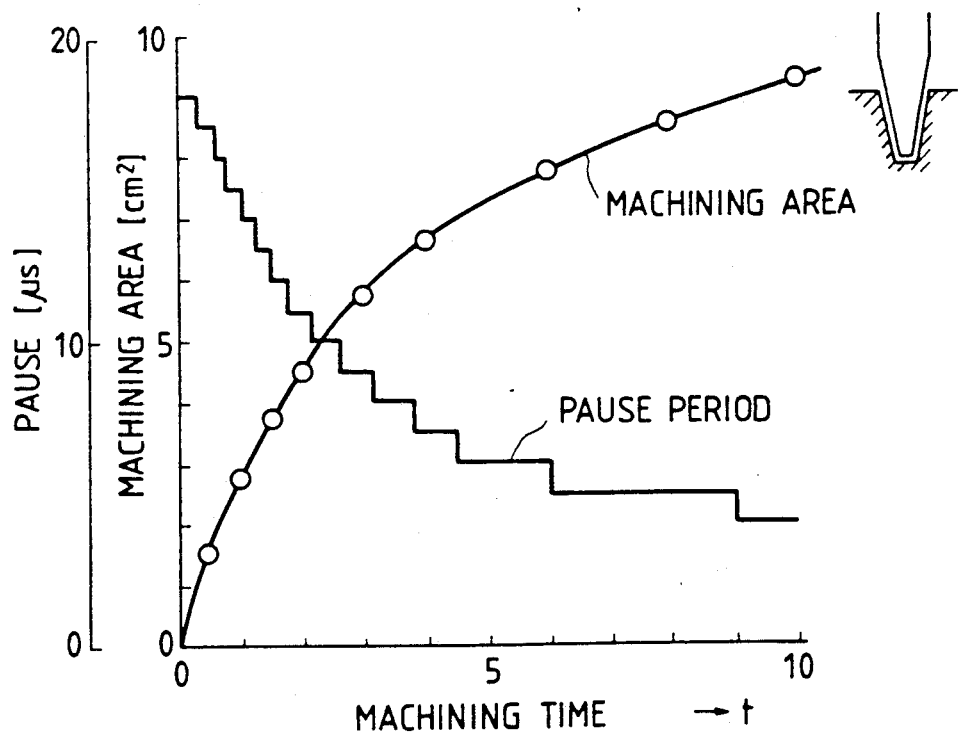
FIG. 10 is a graphical representation for a description of an optimizing control in the invention.
Figure 11:
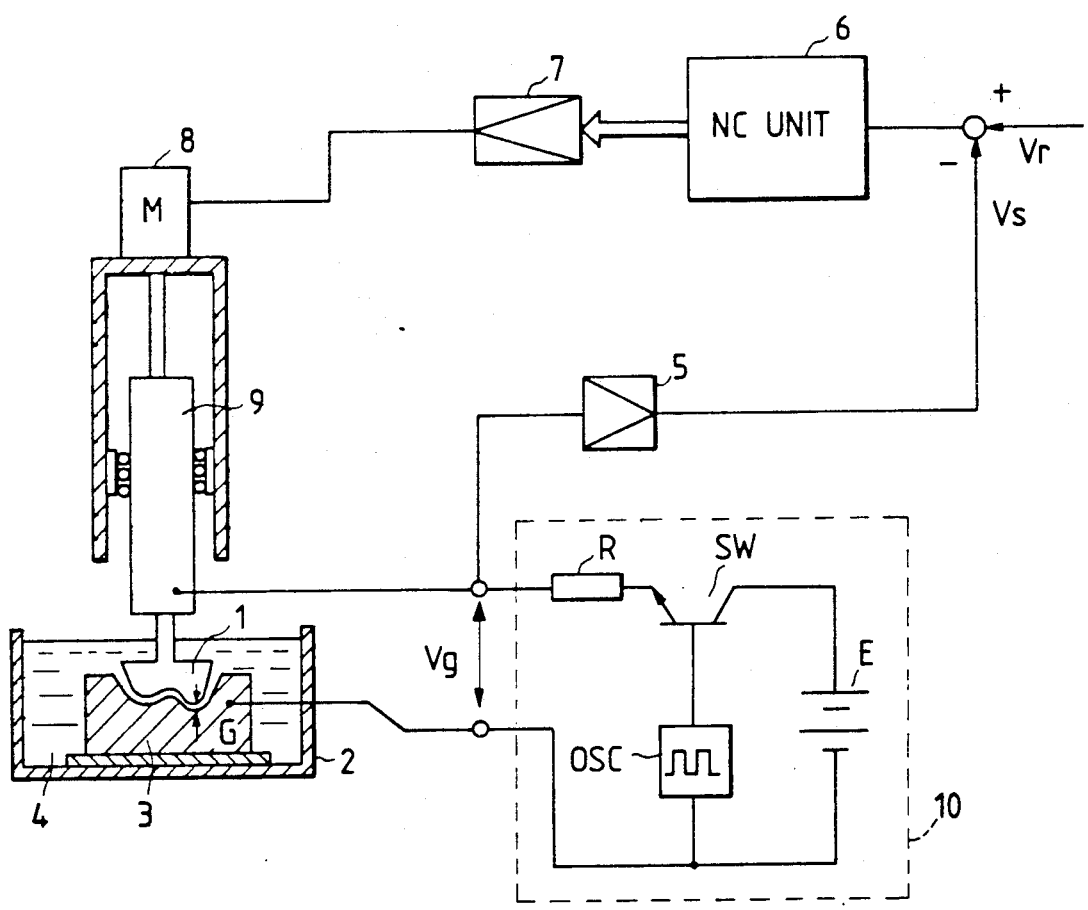
FIG. 11 is an explanatory diagram, partly as a block diagram, showing the arrangement of a conventional electric discharge machine.

FIG. 10 indicates a variation in machining area in the case where a rib electrode is employed. As is seen from FIG. 10, the pause period is controlled in accordance with the machining area variation. In addition to the pause period, the current peak value, the reciprocation conditions, the machining solution conditions, and the machining servo gain may be controlled.

In the above-described embodiments, the machining gap or machining area is obtained from equation (1). Instead of this method, an arithmetic operation may be employed in which the voltage rise time tr and the machining gap or area are provided in the form of a table, so that the machining gap or area is determined from the voltage rise time tr.

As was described above, in the invention, the rise time of the pulse-like voltage or the detecting pulse during the discharge pause period is measured. The result of measurement is utilized to determine a machining gap, thereby change the machining electrical conditions, machining solution conditions and reciprocation conditions, and, in an electric discharge machine using a machining solution containing powder material, to control the addition or renewal of the powder material or the agitation of the machining solution, to thereby stabilize and optimize the machining operation. Hence, the abnormal machining conditions such as for instance arc discharge can be positively detected and avoided, and the low surface roughness finish which has been heretofore impossible to achieve in a large area machining operation can be accomplished. Furthermore, since the machining gap can be accurately detected during machining, the machining depth particularly can be controlled with high accuracy.

Furthermore, in the invention, the rise time of the pulse-like voltage or the detecting pulse voltage during the discharge pause period is measured. The result of measurement is utilized to determine a machining area, thereby to change the machining electrical conditions, machining solution conditions and reciprocation conditions so that the machining operation is stabilized and optimized. Therefore, the abnormal machining conditions such a for instance arc discharge, or abnormal electrode consumption due to the concentration of electric discharge can be positively detected and avoided, with the result that the machining accuracy is remarkably improved. Moreover, the machining current can be most suitably applied according to a variation in machining area according to the invention, and therefore the machining speed can be greatly increased even in the case where the workpiece is intricate in configuration.

What is claimed is:

1. An electric discharge machine in which a workpiece is machined with a pulse-like voltage applied to a machining gap defined by said workpiece and an electrode in a machining vessel containing machining solution comprising:
   measuring means for measuring the rise time tr of said pulse-like voltage; and
   arithmetic means for determining a machining gap G from both the result of measurement of said measuring means and an electric discharge machining area predetermined.

2. An electric discharge machine as defined in claim 1 wherein said measuring means measures first and second rise times $t_1$ and $t_2$ which are required for the voltage to rise a first predetermined voltage $Vr_1$ and to rise a second predetermined voltage $Vr_2$, respectively, so that the rise time tr is obtained according to $tr = t_2 - t_1$, where $$Vr1 = E(1 - e^{-t1/RC});$$

$$Vr2 = E(1 - e^{-t2/RC}); \text{ and}$$

where R represents the resistance of a machining power source, and C is the electrostatic capacity between the electrode and the workpiece.

3. An electric discharge machine as defined in claim 2 wherein said arithmetic means determines the gap G from the rise time tr and an area S of said electrode according to $$C = \epsilon (S/G);$$

where $\epsilon$ represents the dielectric constant of the machining solution; and C is said electrostatic capacity between the electrode and the workpiece, determined from rise time tr.

4. An electric discharge machine as claimed in claim 1 wherein said arithmetic means obtains a machining area from the result of measurement of said measuring means and a machining gap preset.

5. An electric discharge machine as defined in claim 1 wherein said workpiece is machined with the pulse-like voltage applied to said machining gap defined by said workpiece and said electrode in a machining vessel while a machining solution including powder materials is being supplied to said machining gap from a machining solution tank.

6. An electric discharge machine in which a workpiece is machined with a pulse-like voltage applied to a machining gap formed between said workpiece and an electrode in a machining vessel containing machining solution comprising:
   detecting voltage supplying means for applying a detecting pulse voltage during a pause period of time for which said pulse-like voltage is not applied;
   measuring means for measuring the rise time of said detecting pulse voltage; and
   arithmetic means for obtaining a machining gap from the result of measurement of said measuring means and a machining area preset.

7. An electric discharge machine as defined in claim 6 wherein said detecting voltage supplying means applies a low pulse voltage of 20 to 40 V having a pulse width of the order of one to several microseconds to the interelectrode gap, and wherein said measuring means measures first and second rise times $t_1$ and $t_2$ which are required for the voltage to rise a first predetermined voltage $Vr_1$ and to rise a second predetermined voltage $Vr_2$, respectively, so that the rise time tr is obtained according to $tr = t_2 - t_1$, where $$Vr1 = E(1 - e^{-t1/RC});$$

$$Vr2 = E(1 - e^{-t2/RC}); \text{ and}$$

wherein R represents the resistance of a machining power source, and C is the electrostatic capacity between the electrode and the workpiece.

8. An electric discharge machine as defined in claim 7 wherein said arithmetic means determines the gap G from the rise time tr and an area S of said electrode according to $$C = \epsilon (S/G),$$

where $\epsilon$ represents the dielectric constant of the machining solution; and C is said electrostatic capacity between the electrode and the workpiece, determined from rise time tr.

9. An electric discharge machine as claimed in claim 6 wherein said arithmetic means obtains a machining area from the result of measurement of said measuring means and a machining gap preset.

10. An electric discharge machine as defined in claim 6 wherein said workpiece is machined with the pulse-like voltage applied to said machining gap defined by said workpiece and said electrode in a machining vessel while a machining solution including powder materials is being supplied to said machining gap from a machining solution tank.

* * * * *